Nov. 10, 1925.  
V. O. BANKS  
POULTRY FEEDER  
Filed June 13, 1925  
1,561,299  
2 Sheets-Sheet 1
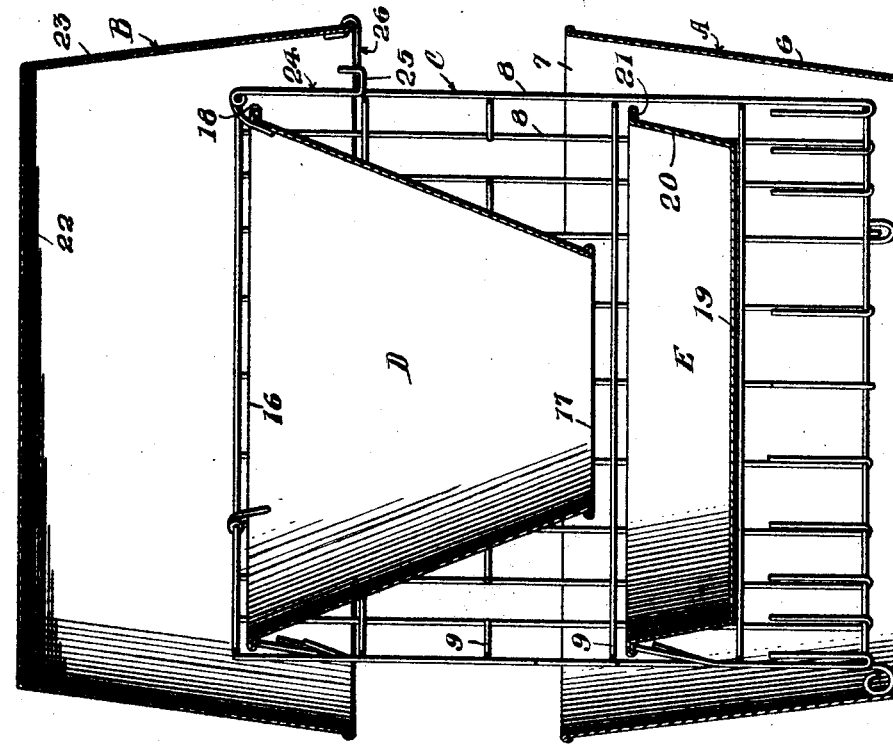

Nov. 10, 1925.                                    1,561,299
V. O. BANKS
POULTRY FEEDER
Filed June 13, 1925          2 Sheets-Sheet 2
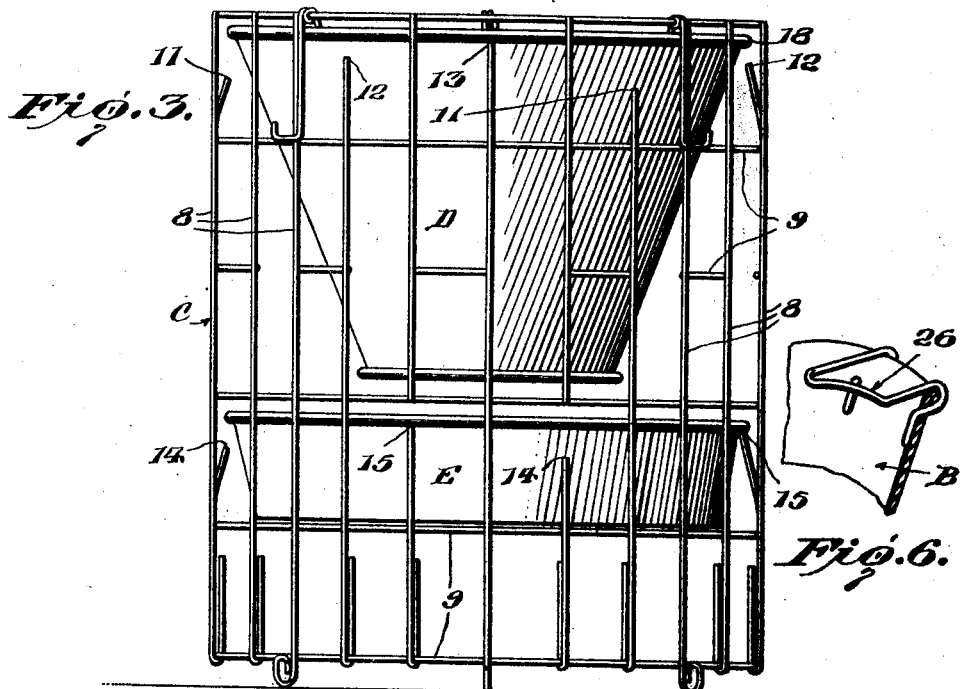
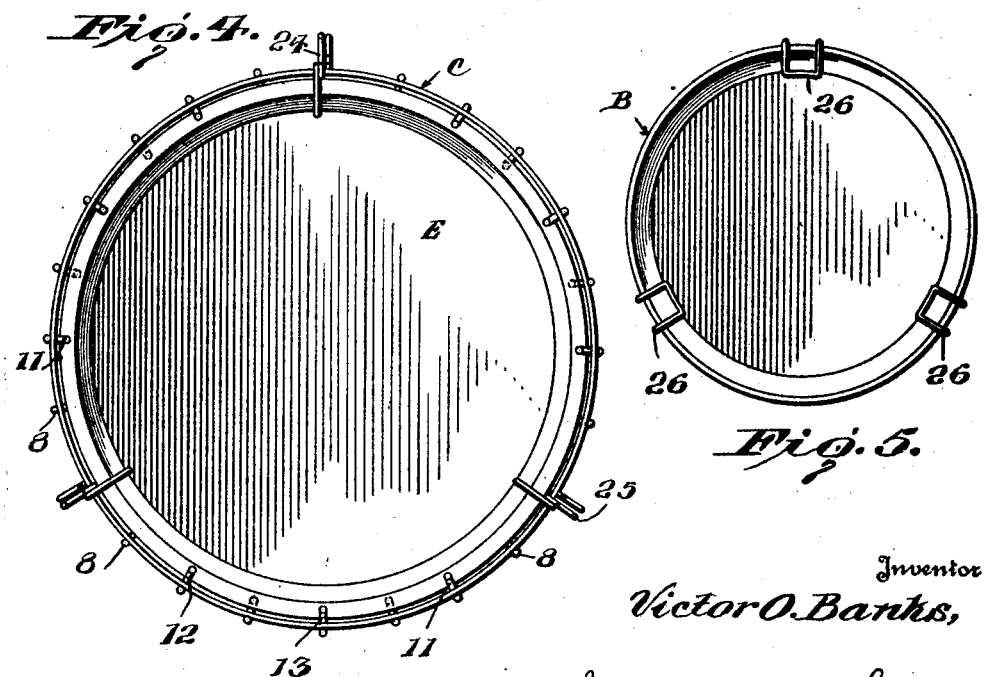
Inventor
Victor O. Banks,
By James Mason Mangham
Attorney Patented Nov. 10, 1925.

1,561,299

UNITED STATES PATENT OFFICE.

VICTOR OWEN BANKS, OF ORTEGA, FLORIDA.

POULTRY FEEDER.

Application filed June 13, 1925. Serial No. 36,866.

*To all whom it may concern:*

Be it known that I, VICTOR O. BANKS, a citizen of the United States, residing at Ortega, in the county of Duval and State of Florida, have invented certain new and useful Improvements in Poultry Feeders, of which the following is a specification.

This invention relates to new and useful improvements in poultry feeders and has amongst its several objects to provide a feeder which while permitting ready access by the fowls to the feed, reduces the amount of feed being scattered by the fowls to a minimum; to provide such a feeder with a wire guard and to position therein a hopper and a hopper pan, said hopper and pan being relatively adjustable vertically so as to insure proper egress of different kinds of feed from the hopper into the hopper pan, and to provide a cover which may be supported in an elevated position so as to permit access by the fowls to the feed, or which may be positioned so as to cover the feed.

In the accompanying drawings which show one embodiment of my invention,

Figure 1 is a side elevation of a poultry feeder constructed in accordance with my invention, Figure 2 is a vertical sectional view thereof, Figure 3 is a side elevation of the frame for supporting the hopper and hopper pan, Figure 4 is a top view thereof, the hopper being removed, Figure 5 is a bottom plan view on a reduced scale of the cover, and Figure 6 is a fragmentary inverted perspective view showing one of the feet for supporting the cover on the guard frame.

Similar reference numerals designate corresponding parts throughout the various figures of the drawings.

Referring to the drawings in detail, my improved poultry feeder includes a receptacle A, a cover B therefor, a guard frame C which is disposed within the receptacle and projects thereabove, a hopper D which is supported within the guard frame for the vertical adjustment, and a hopper pan which is supported within the guard frame below the hopper for vertical adjustments relative thereto.

The receptable A is preferably formed of metal and comprises a closed bottom 5 and an annular wall 6 forming an open upper end 7.

The guard frame C preferably includes a tubular body which is formed by an annular wall comprising a plurality of vertically extending wires 8 and a plurality of horizontal wires 9 which are connected to the vertical wires. Certain of the horizontal wires are interrupted to form spaces 10 for permitting the ready insertion of the heads and necks of fowls. Adjacent the upper horizontal wire 9 certain of the vertical wires 8 are cut, the cut ends of the wires being indicated at 11, 12, and 13 respectively. The guard frame is preferably formed with three sets of cut wires, the sets being spaced apart approximately 120 degrees. The cut ends of the wires 11, 12, and 13 are respectively disposed in different horizontal planes and the end portions directly below the points of cut being bent inwardly to form spring stops.

The cut ends or stops 11 of the three sets, and the cut ends or stops 13 of the three sets are disposed in spaced lower and upper horizontal planes, and the three cut ends or stops 12 are disposed in an intermediate horizontal plane.

The hopper D adjacent the upper end thereof is provided with a flange or shoulder 18 which is adapted to engage all three of the stops 11, or all three stops 12, or all three stops 13, thereby providing means for supporting the hopper in any one of three positions of vertical adjustment.

The hopper pan E is formed of metal and includes a bottom 19 and a wall 20, the latter being formed with a flange or shoulder 21 which is adapted to engage all three of the stops 14, or all three of the stops 15, thereby providing means for supporting the hopper pan in any one of two positions of vertical adjustment.

The cover B is likewise formed of metal and includes a top 22 and a depending wall 23. The diameter of this cover is greater than the diameter of the guard frame C and preferably of the same diameter as the receptacle A. This cover is adapted in one position to rest upon the receptacle A and thereby completely covers the upper end of the guard frame and consequently prevents access of the fowls to the food. When it is desired to permit the fowls to have access to the food, and at the same time prevent the elements from damaging the food, the cover is raised above the receptacle and is detachably supported on the upper end of the guard frame C in such a manner that the cover still functions over the guard frame. In order to support the cover in this upper position of adjustment, I have provided a plurality of brackets 24, which are supported from the upper horizontal wires 9 of the guard frame and which are provided with radially extending arms 25. The cover B is provided along its lower edge with a plurality of inwardly extending fixed supporting arms 26 which rest upon the arms 25, and the cover is thereby supported in its elevated position. Associated with the poultry feeder thus described is a platform 27 for supporting the poultry at a level approximately below the upper edge of the receptacle A.

From the foregoing it will be observed that I have provided a poultry feeder in which the feed is first positioned within hopper D, the feed dropping into the hopper pan E. The poultry being supported on the platform 27 may readily insert their heads and necks through the openings 10 in the guard frame C and thereby pick up the food contained in the hopper pan E. As is well known, poultry when feeding, drop or scatter a considerable amount of the food initially picked up and by reason of my invention approximately all food thus dropped or scattered by the poultry will be received by the receptacle A, the hopper pan E being spaced a considerable distance from the wall 6 of the receptacle. It will also be observed that the hopper D may be positioned in any one of three positions of vertical adjustment relative to the hopper pan, or the hopper pan may be adjusted to either of two positions of vertical adjustment relative to the hopper, thus providing a simple means of adjustment to insure the proper feeding of food of different character from the hopper D into the hopper pan E.

I claim—

1. In a poultry feeder, the combination with the main receptacle, of a guard frame disposed therein, a vertically adjustable feed hopper disposed within said frame, a hopper pan disposed within said frame below the hopper, and cooperating means between the guard and the hopper for maintaining said hopper in any one of a plurality of vertically adjusted positions.

2. In a poultry feeder, the combination with the main receptacle, of a guard frame disposed therein, a vertically adjustable feed hopper disposed within said frame, a hopper pan disposed within said frame below the hopper, and cooperating means between the guard and the hopper for maintaining said hopper in any one of a plurality of vertically adjusted positions, said cooperating means including a plurality of stops fixed to the frame and arranged in spaced horizontal planes, and a shoulder affixed to said hopper for engagement with the stops located in any one of said horizontal planes.

3. In a poultry feeder, the combination with a main receptacle, of a guard frame disposed therein, a feed hopper disposed within the frame, a vertically adjustable hopper pan disposed within said frame below the hopper and cooperating means between the guard frame and hopper pan for maintaining said hopper pan in any one of a plurality of vertically adjusted positions, said cooperating means including a plurality of stops fixed to the frame and arranged in spaced horizontal planes, and a shoulder affixed to said hopper pan for engagement with the stops located in any one of said horizontal planes.

4. In a poultry feeder, the combination with a main receptacle, of a guard frame disposed therein, a feed hopper disposed within said frame, and a hopper pan disposed within said frame below the hopper, said guard frame including spaced vertical wires, and upwardly and inwardly extending spring stops carried by certain of said wires to support said hopper above the pan.

5. In a poultry feeder, the combination with a main receptacle, of a guard frame disposed therein, a feed hopper disposed within said frame, and a hopper pan disposed within said frame below the hopper, said guard frame including spaced vertical wires, and upwardly and inwardly extending spring stops carried by certain of said wires to support said hopper pan below said hopper.

6. In a poultry feeder, the combination with a main receptacle, of a guard frame disposed therein, a feed hopper disposed within said frame, and a hopper pan disposed within said frame below the hopper, said guard frame including spaced vertical wires, certain of said wires being respectively cut and the wire portions directly below the cut ends being bent inwardly to form stops to support the hopper above the pan.

7. In a poultry feeder, the combination with a main receptacle, of a guard frame disposed therein, a feed hopper disposed within said frame, and a hopper pan disposed within said frame below the hopper, said guard frame including spaced vertical wires, certain of said wires being respectively cut in different horizontal planes and the wire portions directly below the cut ends being bent inwardly to form stops to support the hopper above the pan and in different positions of vertical adjustment relative thereto.

8. In a poultry feeder, the combination with a main receptacle, of a guard frame disposed therein, a feed hopper disposed within said frame, and a hopper pan disposed within said frame below the hopper, said guard frame including spaced vertical wires, certain of said wires being respectively cut and the wire portions directly below the cut ends being bent inwardly to form stops to support the hopper pan below the hopper.

9. In a poultry feeder, the combination with a main receptacle, of a guard frame disposed therein, a feed hopper disposed within said frame, and a hopper pan disposed within said frame below the hopper, said guard frame including spaced vertical wires, certain of said wires being respectively cut in different horizontal planes and the wire portions directly below the cut ends being bent inwardly to form stops to support the hopper pan below the hopper and in different positions of vertical adjustment relative thereto.

10. In a poultry feeder, the combination with a main receptacle, of a guard frame disposed therein, a feed hopper disposed within said frame, a hopper pan disposed within said frame below the hopper, and a cover bodily adjusted vertically supported in one position on the receptacle to house the upper portion of the guard frame and in another position supported on the guard frame above the receptacle to permit access by the poultry to the food in the hopper pan.

In testimony whereof I hereunto affix my signature.

VICTOR OWEN BANKS.